United States Patent
Ravenhall

[11] 3,847,698
[45] Nov. 12, 1974

[54] PNEUMATIC TIRES
[75] Inventor: Arthur S. Ravenhall, Solihull, England
[73] Assignee: Dunlop Limited, London, England
[22] Filed: Oct. 10, 1972
[21] Appl. No.: 295,906

Related U.S. Application Data
[63] Continuation-in-part of Ser. No. 50,014, May 5, 1969, abandoned.

[52] U.S. Cl. .......................... 152/209 R, 152/DIG. 1
[51] Int. Cl. ............................................. B60c 11/06
[58] Field of Search ................................ 152/209 R

[56] References Cited
UNITED STATES PATENTS

| | | |
|---|---|---|
| 3,556,191 | 1/1971 | Mills ............................ 152/209 R |
| 2,298,033 | 10/1942 | Bowers et al. .................. 152/209 R |
| 2,604,920 | 7/1952 | Kirby ............................ 152/209 R |
| 2,260,193 | 10/1941 | Overman ........................ 152/209 R |
| 2,843,172 | 7/1958 | Berry et al. .................... 152/209 R |
| 3,095,024 | 6/1963 | Robertson ...................... 152/209 R |

Primary Examiner—Drayton E. Hoffman
Attorney, Agent, or Firm—Stevens, Davis, Miller & Mosher

[57] ABSTRACT

A pneumatic tire provided with a tread pattern having at least one generally circumferentially extending groove having limbs of zig-zag plan form, wherein the base of the groove is of constant width, the width at the mouth of the groove adjacent to a junction is greater than the groove mouth width intermediate the junctions and the change from wider to narrower groove width is graduated so that there is a reduced tendency for the grooves to trap stones during use of the tire.

12 Claims, 2 Drawing Figures

PNEUMATIC TIRES

This application is a continuation-in-part of application Ser. No. 50,014, filed May 5, 1969 now abandoned.

This invention relates to pneumatic tires.

Difficulty is experienced as a result of the trapping between the ribs of a pneumatic tire, of stones or other foreign bodies which lodge in the grooves between the ribs and may, eventually, damage the breaker, if provided, or the casing, or both, of the tire, possibly leading to eventual tire failure.

In prior art tires having grooves of zig-zag form and constant dimensions, stones trapped in the grooves tend to migrate to a point where the groove changes in direction, i.e., to a junction. It is believed that this is due to the fact that a stone is more effectively held by the three surfaces at the junction than the two surfaces, intermediate the junctions, which trap it.

It is an object of the present invention to provide an improved tire tread pattern the use of which is less likely to cause stone trapping.

According to the present invention a pneumatic tire is provided with a tread pattern having at least one generally circumferentially-extending groove having limbs of substantially zig-zag or undulating plan form, a junction being formed between the ends of adjacent limbs, the width at the mouth of the groove adjacent to at least some of the junctions, at each end of at least some of the limbs, being greater than the groove mouth width intermediate at least some of said junctions, the change from wider to narrower width being graduated and the base of the groove being a constant width.

While the relative widths at the mouth of the groove at a junction and intermediate the junctions is defined in the preceding paragraph in respect of at least some of the limbs of the grooves, the invention covers also the relative widths defined in respect of all of the limbs.

In a preferred form of the invention the groove, when viewed in cross-section, is of substantially V-form, rather than of U-form, being wider at the mouth than at the base, the mouth of the V-form being more open at locations at or adjacent to each junction than intermediate the junctions, i.e., the included angle of the flanks of the V-form is greater at or adjacent to each junction.

It is preferred that the increase in groove mouth width from the narrowest point of each groove to the widest point of each groove measured at the ground-contacting surface of the tire in the unworn condition thereof lies between 10 to 25 percent of the narrower width, the width being measured in a direction normal to one side of the groove.

One embodiment of the invention will now be described in more detail with particular reference to the accompanying drawings wherein.

Figure 1:
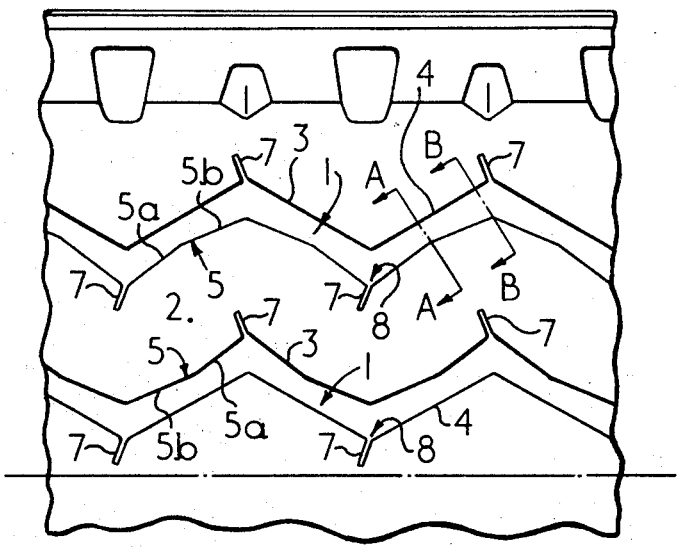
FIG. 1 illustrates a diagrammatic fragmentary plan view of a tire tread according to the embodiment of the invention.

A 10.00 – 20 commercial vehicle tire is constructed with a carcass of radial cords made from steel wires and a tread having a pattern moulded into it of the following description.

Four zig-zag grooves 1 (two only being shown) are provided between five zig-zag ribs 2 (three only being shown), including two shoulder ribs (one only being shown). Each limb 3 of each of the zig-zag grooves 1 has one wall 4 which is linear, when viewed in plan, and an opposed wall 5 which is non-linear when viewed in plan, the wall 5 being formed of two mutually inclined faces 5a and 5b which are of unequal length and have an included angle of about 170°.

The result of this arrangement is that the groove width, at the mouth, is narrowest at a point about midway along the length of each limb 3 of the zig-zag groove 1, the widest point at the mouth being provided at the junction 8 which is the point at which a zig-zag limb changes direction to form the next limb.

Figure 2:
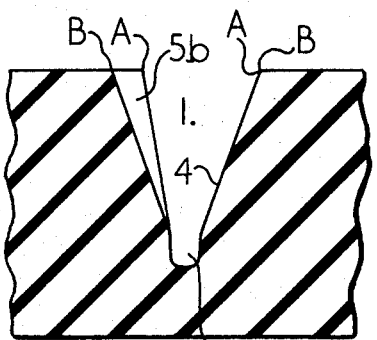
FIG. 2 illustrates sections on line A—A and line B—B of a groove of the tire tread illustrated in FIG. 1.

The cross-sectional form of the groove 1 illustrated in FIG. 2 is of substantially V-form, the base 6 of the V being rounded and of constant width about the circumference of the tire. It will be appreciated that the groove 1 is, therefore, wider at the mouth and narrower at the rounded base 6. It is arranged that the divergent form of the groove 1 is of greatest extent adjacent to the junctions 8 and of least extent at a point lying on line A—A along the length of the limb of the groove 1 where the groove 1 is narrowest.

Each of the zig-zag grooves is of about 0.40 inches at its narrowest point, i.e., measured along line A—A, and it enlarges to about 0.46 inches at its widest point adjacent to the junction 8 (i.e., an increase of about 12 percent), the dimensions being taken at right-angles to the linear side 4 of the groove 1 at the mouth. The angle of divergence is about 40° adjacent to a junction 8 and about 32 1/2° at the point of narrowest groove width.

The zig-zag grooves 1 are provided at each junction 8 with a narrow transverse slot 7 of width about 0.03 inches and length about 0.3 inches. These transverse slots 7 extend from the groove 1 alternately from one side of the groove to the other side as the zig-zag groove progresses around the circumference of the tire.

It is an advantage of the tread pattern of the present invention that stone trapping is considerably less likely to occur than has been found with other tires. This is because the groove configuration of the present invention takes advantage of the tendency of stones to migrate to a junction in tires having zig-zag shaped grooves by enabling a trapped stone to more readily move to the junction 8, i.e. the widest portion of the groove. Such movement to the junction 8 is accomplished by providing a groove configuration which has a constant width base and a groove mouth which not only is wider than the groove base, but which also diverges from a point about midway along the length of each limb 3 to the junction 8. Therefore, during rotation of the tire a trapped stone may more easily move radially outward from the groove and towards the widest groove mouth area, i.e., junction 8.

What is claimed is:

1. A pneumatic tire provided with a tread pattern having at least one generally circumferentially extending groove having limbs of substantially zig-zag or undulating plan form, a junction being formed between the ends of adjacent limbs, the width at the mouth of the groove adjacent to at least some of said junctions, at each end of at least some of said limbs, being greater than the groove mouth width intermediate at least some of said junctions, the change from wider to narrower width being graduated wherein each limb of the zig-zag groove has one wall which is substantially linear, when viewed in plan, and an opposed wall which is substantially non-linear when viewed in plan.

2. A pneumatic tire according to claim 1 wherein the wall which is substantially non-linear when viewed in plan comprises two mutually inclined faces.

3. A pneumatic tire according to claim 2 wherein the two mutually inclined faces are of unequal length.

4. A pneumatic tire according to claim 3 wherein the included angle between the two mutually inclined faces of unequal length is of the order of 170°.

5. A tread pattern for a pneumatic tire having at least one generally circumferentially extending groove, said groove being defined by a plurality of limbs of substantially zig-zag or undulating plan form, each said limb having a pair of walls, wherein a junction is formed between the walls at the ends of adjacent limbs, said groove having a mouth width at several of said junctions which is greater than the groove mouth width at a point intermediate two adjacent junctions, wherein the change from wider to narrower width is graduated, the groove having a base of constant width around the circumference of the tire.

6. A tread pattern according to claim 5 wherein the mouth of the groove is of maximum width at said junctions.

7. A tread pattern according to claim 5 wherein the groove cross-section is substantially of V-form.

8. A tread pattern according to claim 5 wherein one wall of each limb is substantially linear, when viewed in plan, and the other wall is substantially non-linear when viewed in plan.

9. A tread pattern according to claim 8 wherein the wall which is substantially non-linear when viewed in plan comprises two mutually inclined faces.

10. A tread pattern according to claim 9 wherein the two mutually inclined faces are of unequal length.

11. A tread pattern according to claim 10 wherein the included angle between the two mutually inclined faces of unequal length is of the order of 170°.

12. A tread pattern according to claim 5 wherein the increase in width from the narrowest point of each groove mouth to the widest point of each groove mouth measured at the ground-contacting surface of the tire in the unworn condition thereof lies between 10 percent to 25 percent.

* * * * *